L. J. HEATHCOTE.
SHIP SPEED INDICATOR.
APPLICATION FILED APR. 28, 1911.
1,020,980.
Patented Mar. 26, 1912.
2 SHEETS—SHEET 1.
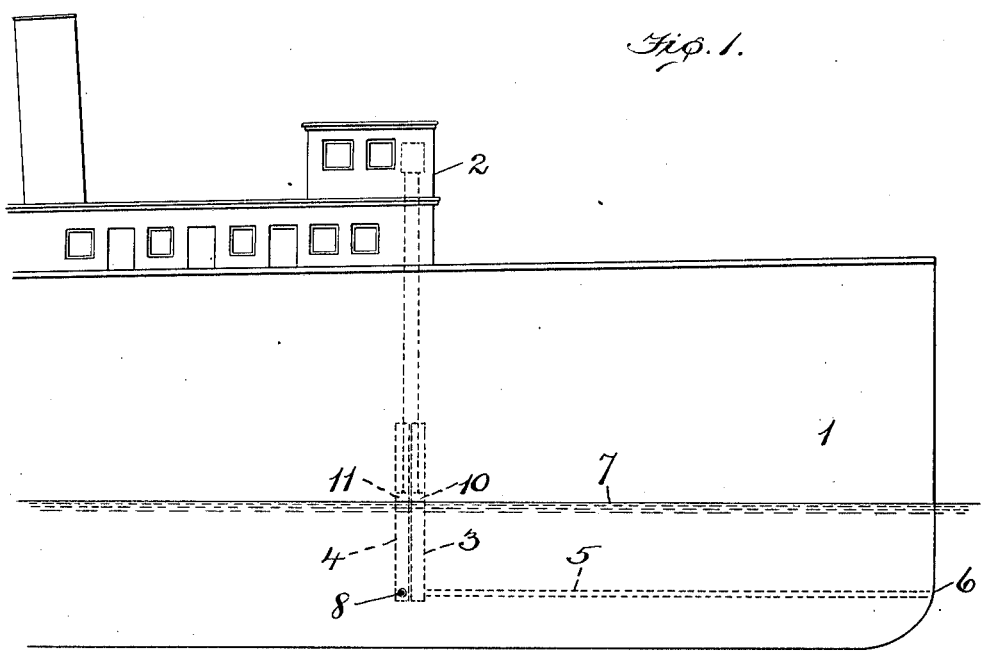
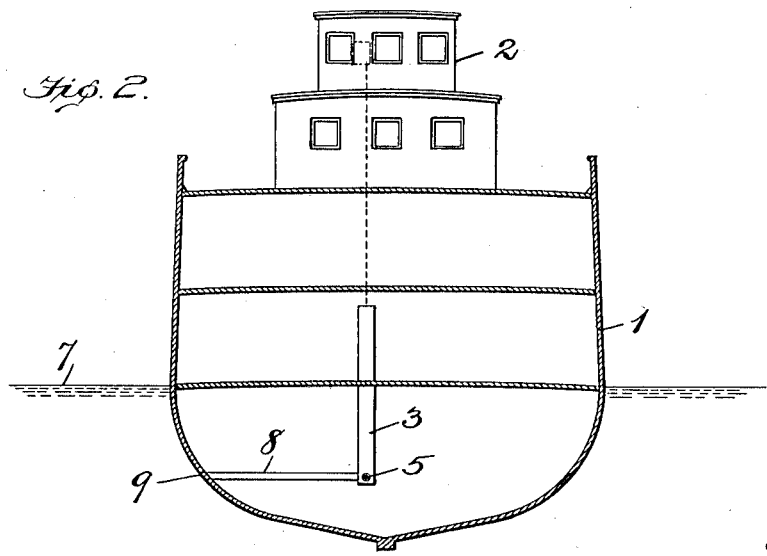

L. J. HEATHCOTE.
SHIP SPEED INDICATOR.
APPLICATION FILED APR. 28, 1911.
1,020,980.
Patented Mar. 26, 1912.
2 SHEETS—SHEET 2.
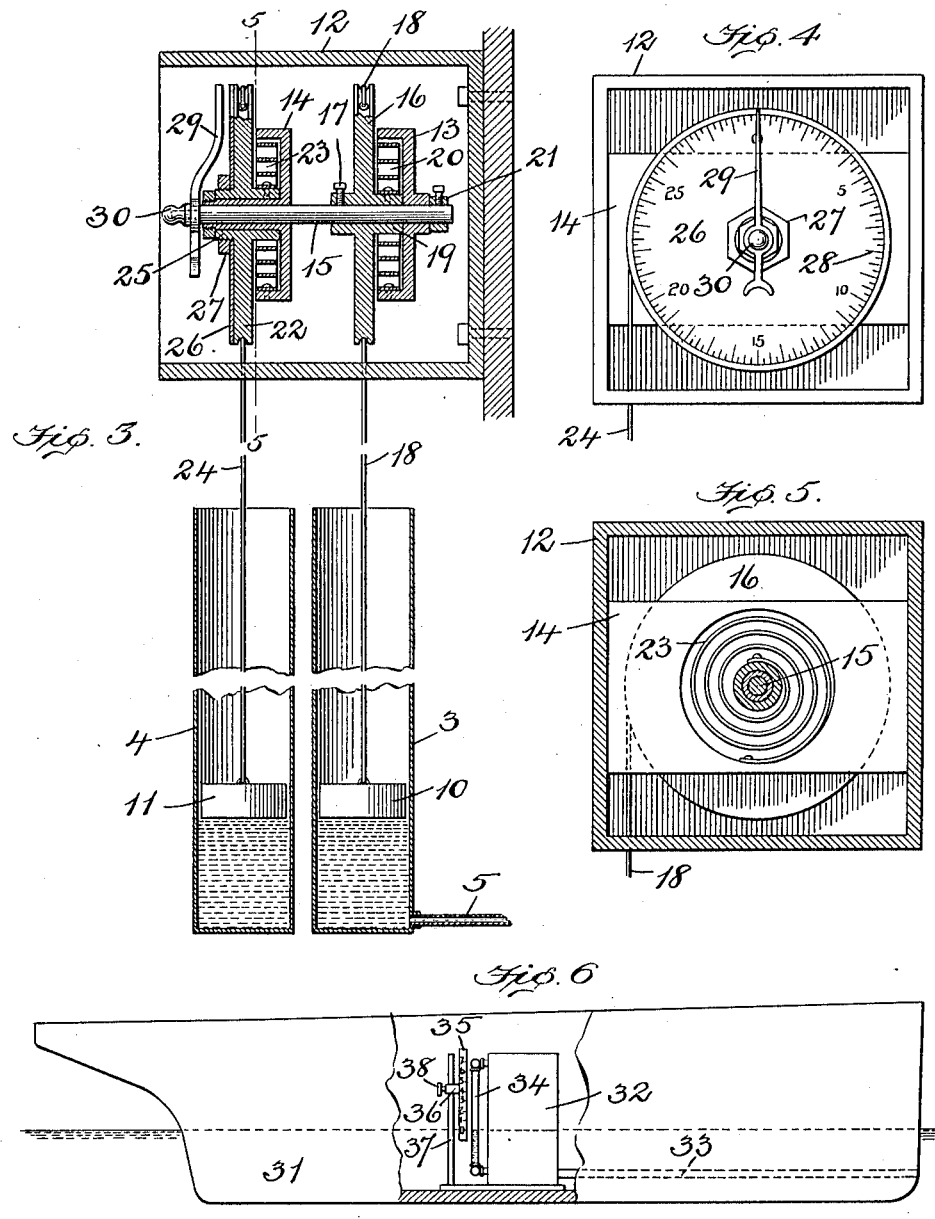

UNITED STATES PATENT OFFICE.

LEWIN J. HEATHCOTE, OF BALTIMORE, MARYLAND.

SHIP-SPEED INDICATOR.

1,020,980.  Specification of Letters Patent.  Patented Mar. 26, 1912.

Application filed April 28, 1911. Serial No. 623,841.

*To all whom it may concern:*

Be it known that I, LEWIN J. HEATHCOTE, a citizen of the United States, residing at Baltimore, in the State of Maryland, have invented certain new and useful Improvements in Ship-Speed Indicators, of which the following is a specification.

This invention relates to indicators for moving bodies and has particular reference to an indicator for ships.

One object of the invention is to provide an improved simple, inexpensive and reliable indicator for ships, launches and the like which will enable the speed and draft of the ship to be determined at a glance.

Another object is to provide an improved indicator which will automatically adjust itself when the ship passes from fresh to salt water or vice versa and thus maintain an accurate indication of the speed or draft of the ship.

Another object is to provide an improved construction of indicator mechanism that may be readily placed at any desired place on board ship.

A further object is to provide an improved indicator having a dial and a pointer movably sustained and independent of each other with means to automatically move the dial according to the draft of the ship and with independent means to move the pointer for both variations in the draft and variations in the speed of the ship.

With these and other objects in view the accompanying drawings illustrate the invention, wherein,—

Figure 1, is a side elevation of the front or forward part of a ship to which my improved indicator is attached. Fig. 2 is an enlarged vertical cross-sectional elevation through the ship showing the device in elevation. Fig. 3, is an enlarged vertical section through the dial and pointer mechanism of the indicator and also through the cylinder, and shows the connection between the floats and said mechanism. Fig. 4, is an enlarged front view of the dial and pointer. Fig. 5, is a vertical section through the indicator casing,—the section being taken on the line 5—5 of Fig. 3, and Fig. 6, is a side elevation of the front and rear portions of a launch,—the intermediate portion being broken away to show a modified form of the invention.

Referring to the drawings by numerals, 1, designates the hull of the ship, which latter in the present instance is illustrated as a steamship, but which may be a sailing vessel or a launch.

The dial and pointer mechanism may be located at any suitable or desired point, but is preferably placed in the wheel house, which is designated, 2, in the drawing. The means for actuating the dial and pointer is located in the hull and in the present instance is shown directly beneath the wheel house and immediately over the keel. This latter location is desirable because the connections between the actuating means in the hull and the indicating mechanism in the wheel house may be more readily made and the intervening transmission means thus simplified. It is also desirable that the actuating means be low in the hull because it is necessary to admit water from the exterior in carrying out my invention, to determine the draft and speed and therefore connections must be made to the exterior below the water line.

In carrying out the invention I provide two cylindrical receptacles, 3, and, 4, respectively in the hull and from the lower end of cylinder, 3, a pipe, 5, extends forward and passes through the wall of the hull so that its end, 6, may be exposed on the exterior and below the water line indicated by the numeral 7, thus allowing water to pass from the exterior through said pipe and into the cylinder, 3. The cylinder, 4, is also provided with a pipe, 8, which latter extends laterally from the lower end thereof and substantially at right angles to pipe, 5, and said pipe, 8, passes through and has an end, 9, that is exposed on the exterior of the hull so as to allow water to seek its level in the cylinder, 4. The cylinder, 3, has a float, 10, therein while cylinder, 4, is also provided with a float, 11, and both of these floats are sufficiently free in the cylinders to permit them to rise and fall with the water that sustains them and which is admitted through the pipes, 5, and, 8, respectively from the exterior. It will thus be seen that when the ship is at rest the floats, 10, and 11, will assume horizontal positions in the cylinders on a level with the water level on the exterior of the hull and by this means may be made to assume positions that indicate the draft of the ship. Obviously, as the draft varies by increasing or diminishing the load or when the ship has passed from fresh into salt water or vice versa, the floats will rise or fall accordingly.

In carrying out my invention I make use of the rise and fall of the floats, 10, and, 11, to indicate the speed and draft of the vessel,—it being understood that as the ship moves forward the pressure of water at the front end, 6, of pipe, 5, will be conveyed to the cylinder, 3, and effect an elevation of the float, 10, therein and that the faster the ship moves the greater will be that pressure and consequently the water in cylinder, 3, will be elevated above the water level on the exterior of the ship. At the same time the level of water in the cylinder, 4, remains substantially the same as the level on the exterior of the ship because the end, 9, of pipe, 8, is not subject to the pressure like the end, 6, of pipe, 5.

In the wheel house, 2, or at any other convenient place, I provide an indicator mechanism which I have found may be constructed in many different ways, but in the present instance the form illustrated comprises a suitable casing, 12, having suitable supports, 13, and, 14, respectively which extend crosswise thereof and are rigid therein. These supports sustain a short horizontal shaft, 15, and a pulley, 16, is carried on said shaft between said supports and is rigidly secured to the shaft by means of a set screw, 17. The periphery of the pulley, 16, is preferably grooved, which however is not essential, and a band or wire, 18, extends about the periphery and depends therefrom,—the depending portion extending in any suitable manner and by the aid of any suitable means, such as idlers or guides, to the upper end of the cylinder, 3, into which it extends and has its lower end connected to the float, 10, in said cylinder, 3.

The pulley, 16, has a hub, 19, at one side around which a spring, 20, is coiled and the inner end of this spring is secured to the pulley hub while the outer end thereof is attached to an overhanging projection on the support, 13. The spring, 20, is so attached that when the float, 10, in cylinder, 3, rises the pulleys, 16, will be turned sufficiently to take up and prevent the wire, 18, from becoming slack,—thus the pulley will turn in one direction only when the float rises and will move in the other direction as the float descends in the cylinder. The pulley, as previously explained, is rigid on the shaft, 15, and when turned will also turn said shaft. The inner end of the shaft has a collar, 21, which prevents longitudinal movement thereof in one direction through the supports, 13, and, 14, and the hub of pulley, 16, will prevent said shaft from moving in the other direction.

A pulley, 22, of same diameter as pulley, 16, is mounted freely on the outer end of the shaft, 15, and in front of the bearing support, 14, and said pulley has a hub which projects toward the support and around which a spring, 23, is wound. This spring has its inner end attached to the hub of pulley, 22, and its outer end is secured to a projection from the support, 14, to draw on the pulley and turn the latter as will presently be explained. A wire or band, 24, extends about the periphery of the pulley 22, and depends therefrom and said depending portion is directed and guided in any suitable manner to the cylinder, 4, in which it extends and is connected to the float, 11. It will therefore be understood that when float, 11, which may be termed the draft indicator float, rises or falls in the cylinder, 4, the pulley, 22, will be turned freely on shaft, 15.

The pulley, 22, has a hub portion, 25, at its outer side and a circular dial plate, 26, is secured against the front face of the pulley so as to turn with the latter. In the present instance the dial plate is adjustably sustained by means of a clamping collar, 27, which screws on the hub portion, 25, and presses the dial plate against the pulley. By loosening the collar the said dial plate may be turned and then clamped again by tightening the collar. The dial plate has suitable radially-arranged scale lines, 28, on its front flat surface which are so divided as to designate the speed in knots, and the outer end of shaft, 15, carries a pointer or indicator arm, 29, which is adjustably secured to said shaft by means of a suitable binding or thumb nut, 30. This pointer or indicator arm will turn with shaft, 15, and pulley, 16, as the float, 10, in speed cylinder, 3, rises or falls, and in turning will register with one or another of the scale lines on the dial plate, according to the position of the float in said cylinder, 3. The float, 10, will assume a position in the cylinder according to the level of water therein and this water level is determined by the speed of the ship and the pressure created thereby in the pipe, 5. It is to be understood that the pipe 5, is very much smaller in diameter than the cylinder, 3, and by this means the variations of pressure in pipe, 5, caused by the waves, unsteady motion of the vessel and other irregularities, will not be effective in the cylinder, 3, but said pipe will reduce the fluctuations in rise and fall of water in the tanks, 3, and, 4, to a minimum thereby giving a steady indication even though the device be placed upon a boat propelled by oars. Pipe, 8, is much smaller than tank, 4, so as to avoid the fluctuations in cylinder, 4, from side pressures.

It is understood that the inventive idea here disclosed does not necessarily require the dial plate or the pointer to be repeatedly adjusted every time the vessel stops as will presently be explained, and the invention is not to be restricted in this respect.

In operation, supposing the ship to be at rest, the water from the exterior will pass through pipes, 5, and, 8, into the cylinders, 3, and, 4, until the water level in the cylinders is the same as that on the exterior of the hull. This will cause the floats, 10, and, 11, to rise in the cylinders and obviously the pulleys, 16, and, 22, will turn to take up the slack on the wires, 18, and, 24, and while the pointer or indicator arm will be in proper register with the scale lines on the dial plate, the zero point of the latter will have turned to one side because the pulley, 22, will have turned as the float, 11, is raised. To readjust this and set the zero point of the dial plate at a central point over the shaft merely however for convenience in reading, the lock collar, 27, will be loosened and the dial plate turned back without disturbing the pulley, 22,—the collar will then be locked again and the dial plate thus set in its adjusted position. To then have the pointer or indicator arm conform to the adjustment of the dial plate the nut, 30, will be loosened and the pointer turned back without turning the shaft, 15, until it is made to register with the zero point on the dial plate whereupon the nut, 30, will again be tightened and the pointer locked to the shaft, 15. The apparatus is then in condition for operation. This adjustment is made after the ship is loaded and while at rest and need not to be made again unless desired.

It is obvious that a stationary indicator plate may be employed and the pointer or hand merely adjusted with respect to it before the start is made, and as long as the ship remained in fresh water, if the adjustment had been made in fresh water, or in salt water, if the adjustment had been made while the ship was in salt water, the indicator arm would show the speed with substantial accuracy, but in the case of a stationary indicator plate, if the adjustment was made in fresh water and the ship passed into salt water without further adjustment to the plate then the speed would not be properly indicated because the draft of the ship would not be as great in salt water as it was in fresh water and the indicator arm would be turned back on the scale or indicator plate and would thus show a less speed than the ship was actually making. It will therefore be seen that if a stationary indicator scale is used an adjustment must be made thereto when the ship changes from fresh to salt water or vice versa.

By means of the two cylinders and floats, and the independent connections with the dial plate and the indicator arm, the travel of the ship from fresh to salt water or vice versa, is immaterial to a proper indication because a movement imparted to one float as the result of the change will cause a like movement to be imparted to the other float and the two floats will have the same degree of movement although the one in the speed indicating receptacle, 3, may be higher than the float in the scale indicator receptacle, 4. As the result of the movement of the two floats the dial plate and the pointer or indicator arm will automatically move together in the same direction and for the same distance whenever such change of water takes place, thus maintaining their corresponding relation and giving a proper indication of the speed by noting the position of the indicator arm with respect to the zero point on the scale.

As an example of the modification of the invention, attention is directed to Fig. 6, of the drawing wherein the hull, 31, of a small power boat, such as a launch is shown, and in which I provide a cylinder, 32, from which a small pipe, 33, leads from the bottom and extends forward to the bow and has its forward end exposed on the exterior of the hull to convey water to the cylinder. A glass water gage tube, 34, is provided on the cylinder and shows the depth of water in the cylinder, which when the boat is at rest will show the same as the water level on the exterior of the hull. A scale bar, 35, is adjustably secured adjacent to the gage tube so that it may be moved vertically with respect to the tube and thus bring the zero point of the scale in register with the level shown in the tube when the boat is ready to start and the draft is known. In the present instance the scale bar, 35, has a side lug, 36, which engages a vertical supporting rod, 37, and a set screw, 38, serves to retain the lug and scale bar in the adjusted position. In this modified form the operation is similar to that of the preferred form of device both employing vertical tanks or pipes showing the rise and fall of water supplied as a result of pressure through a small pipe and having adjustable scales. In the preferred form described the scale is self-adjusting, while in the latter the scale should be changed when the vessel has a different draft.

Having thus described my invention what I claim and desire to secure by Letters Patent is,—

1. In a ship speed indicating device the combination with a receptacle having a water inlet, a pipe extending from the lower end of the receptacle and opening through the hull of the ship and pointing in the direction in which the ship is moving to vary the height of water in the receptacle according to the speed of the vessel; an indicator device, means for supporting said indicator device and means for adjustably securing the indicator device with respect to its support and also with respect to the height of the water in the receptacle while the ship is at rest and its draft is determined.

2. In a ship speed indicator the combination with a receptacle having a water inlet near its bottom and below the water line, of a float in said receptacle; a pipe extending from the said inlet to the exterior of the ship and below the water line; an indicator device; means for supporting said indicator device; connections between the float and indicator device and means for adjustably securing the indicator device with respect to its support and also with respect to the float.

3. In a ship speed indicator the combination with a receptacle having a comparatively small water inlet from below the water line of the ship, of a float in said receptacle, an indicator support; an indicator carried by said support and having two elements one of which is movable as the speed of the ship varies; connections between the float and said movable element of the indicator to move said movable element as the float is moved in the receptacle and means for adjustably securing the other element of the indicator with respect to its support and according to the position of the float in the receptacle when the ship is at rest.

4. In a ship speed indicator the combination with a receptacle having a comparatively small water inlet at a point below the water line of the ship, of a float in said receptacle; an indicator having an element movable according to the speed of the ship and another element that is movable according to the draft of the ship; connections between the float and the movable speed element of the indicator and means for moving the other element of the indicator as the draft of the ship changes.

5. In a ship speed indicator the combination with two receptacles, of a float in each receptacle; a pipe extending from one receptacle to the exterior of the ship and below the water line and opening in the direction in which the ship is to move; a pipe from the other receptacle and opening at the side of the ship below the water line; an indicator having a movable scale; a movable arm for the indicator; connections between one of said floats and said arm and connections between the other of said floats and the movable indicator scale.

6. In a ship speed indicator the combination with a rotatable indicator dial, of an arm movable independently of and adjacent to the dial; means for moving the dial according to the draft of the ship, and means for moving the arm according to the speed of the ship.

7. In a ship speed indicator the combination with a rotatable indicator dial, of an indicator arm movable independently of and adjacent to the dial; a float maintained on a level with the water line of the ship; connections between said float and the rotatable dial; a receptacle; a pipe extending from the receptacle and exposed on the exterior of the latter below the water line; a float in said receptacle and connections between the float in said receptacle and the movable indicator arm for moving the said arm with respect to the dial.

In testimony whereof I affix my signature in presence of two witnesses.

LEWIN J. HEATHCOTE.

Witnesses:
CHARLES B. MANN, Jr.,
G. FERD. VOGT.

---

Copies of this patent may be obtained for five cents each, by addressing the "Commissioner of Patents, Washington, D. C."